Jan. 29, 1963    P. FREEDMAN    3,075,736
VEHICLE SEAT
Filed June 23, 1960    5 Sheets-Sheet 4

INVENTOR.
PAUL FREEDMAN
BY Morris Spector
ATTY.

United States Patent Office 3,075,736
Patented Jan. 29, 1963

3,075,736
VEHICLE SEAT
Paul Freedman, 1825 W. Newport Ave., Chicago 13, Ill.
Filed June 23, 1960, Ser. No. 38,244
25 Claims. (Cl. 248—400)

In trucks and buses, the driver's seat is often supported on a pedestal through a spring suspension to absorb at least a portion of the road shock transmitted through the vehicle body. As the vehicle is travelling along the road, the vibrations from road shock transmitted to the seat and spring support therefor depend both upon the irregularities in the road surface and the speed at which the vehicle is moving. Thus, depending upon these two conditions, the seat will oscillate at different frequencies and amplitudes. Since this frequency range varies considerably it sometimes happens that over a certain stretch of road the seat will commence vibrating at or near its natural frequency and cause an excessively high amplitude of vibration. This results in discomfort and driver-fatigue. Moreover, the fact that the aforementioned range of frequencies is so wide makes it almost impossible to design a seat which does not have a natural frequency in this range and at the same time be sufficiently comfortable and resilient enough under normal road conditions.

Another source of driver-fatigue results from sudden forward and reverse movement of the driver's body toward and away from the back rest of the seat. Such movement is commonly known as "whip" and "back slap." The forces causing whip and back slap arise from acceleration and deceleration of the vehicle as well as from any forward and rearward pitching of the vehicle. Whip and back slap are particularly prevalent in truck-tractors when they are hauling semi-trailers. The front end of the trailer is supported by the fifth wheel of the tractor and when the rear wheels of the tractor strike a bump in the road, the fifth wheel and front end of the trailer rise slightly, thus causing a forward pitch of the tractor cab which "whips" the driver. When the bump has been passed, the weight of the front end of the trailer drops down sharply, like a hammer blow, causing the trailer cab to pitch rearwardly, whereupon the driver's body is thrown back against the back rest of the seat.

It is, therefore, an object of the present invention to provide a vehicle seat support having a spring suspension which includes a shock absorber that can very quickly be cut in or out to change the natural frequency of the seat and suspension and thus dampen the vibration of the seat when the road and speed conditions are such that the seat would otherwise vibrate at or near its natural frequency.

It is a further object of the present invention to provide a seat of the type stated wherein the shock absorber can be quickly and easily cut in and cut out by the driver while the latter is in the seat and driving the vehicle.

It is another object of the present invention to provide a vehicle seat of the type stated wherein the seat frame is slidably mounted on the spring suspension for back and forth movement and is connected to the suspension by a torsion spring in such a manner that the seat absorbs a large portion of the shocks due to whip a back slap.

It is a still further object of the present invention to provide a vehicle seat of the type stated in which the seat frame and seat suspension are mounted upon a pedestal which includes a pair of individually adjustable jacks, whereby the seat proper may be raised, lowered or tilted, as desired, thus providing a wide range of seat positions for the driver of the vehicle.

The attainment of the above and further objects of the present invention will be apparent from the following specification taken in conjunction with the accompanying drawing forming a part thereof.

Figures 4, 6:
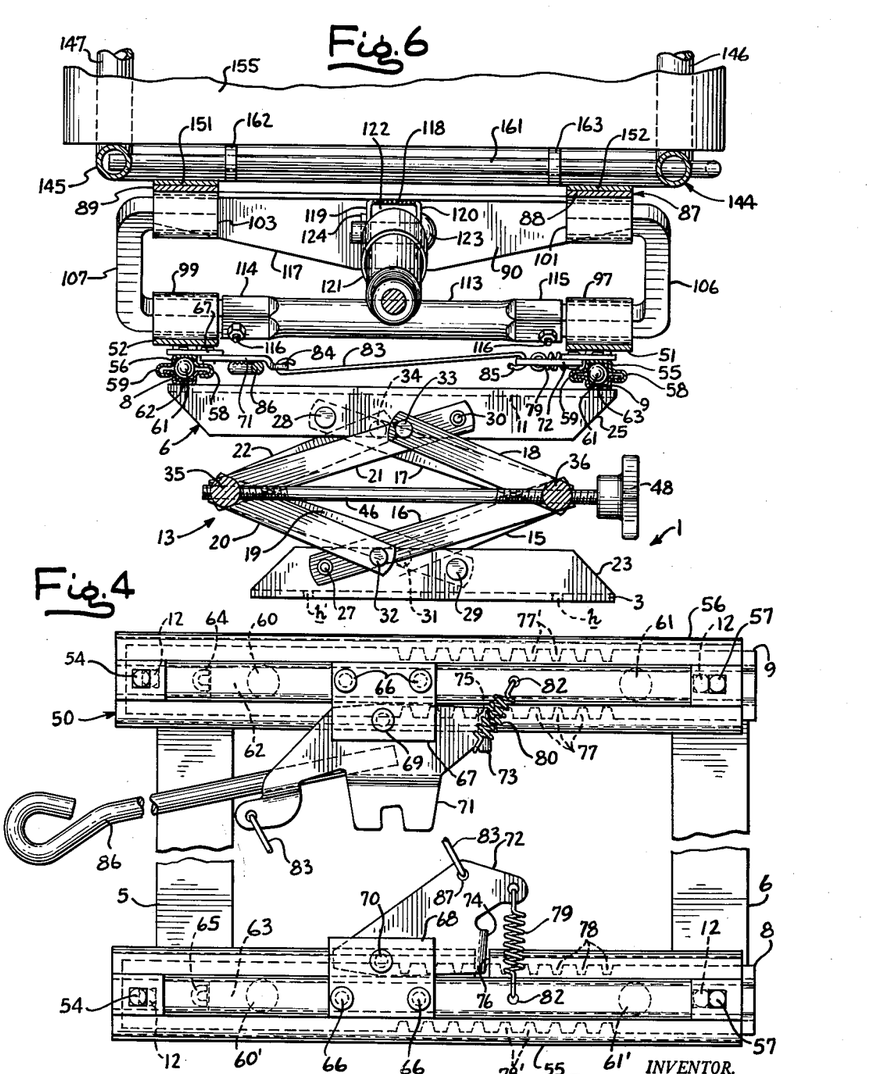
FIG. 6 is a fragmentary sectional view taken along line 6—6 of FIG. 5.

Referring now in more detail to the drawing which illustrates a preferred embodiment of the present invention, A designates a vehicle seat assembly comprising a pedestal 1 having a pair of spaced parallel base-forming angle members 2, 3 which include bolt holes h, h' for receiving bolts (not shown) whereby the angle members 2, 3 may be bolted to the floor board of a truck, bus or other motor vehicle. The pedestal 1 also includes an upper frame 4 having spaced angle members 5, 6 which are cross connected at their opposite ends by spaced parallel channel rails 8, 9. The channel rails 8, 9 are secured at their opposite ends to the horizontal flanges 10, 11 of the angle members 5, 6 by bolts 12 (FIG. 4).

Figure 3:
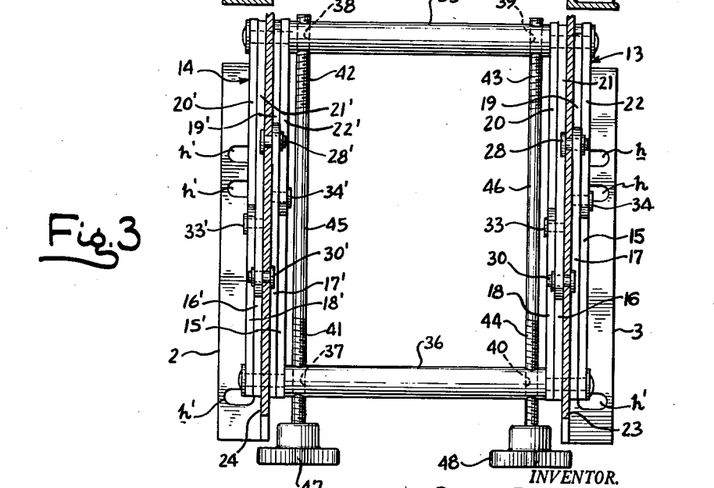
FIGS. 3, 4 and 5 are sectional views taken along lines 3—3, 4—4 and 5—5, respectively, of FIG. 2, FIG. 4 being a fragmentary section.

Connecting the angle members 2, 3 to the upper frame 4 is a pair of identical "scissors-type" jacks 13, 14. The jack 13 has eight jack links 15, 16, 17, 18, 19, 20, 21, 22. The jack links 16, 17, 19, 21 are pivotally connected by pins 27, 28, 29, 30 to vertical flanges 23, 24, on the angle members 3, 6. Furthermore, the jack links 15, 16, 18, 17 are pivotally connected to the jack links 19, 20, 21, 22, respectively, by pivot pins 31, 32, 33, 34. Similarly, the jack 14 comprises jack links 15', 16', 17', 18', 19', 20', 21', 22', the jack links 16', 17', 19', 21' being pivotally connected at 27', 28', 29', 30' to vertical flanges 25, 26 on the angle members 5, 6. Also, the jack links 15', 16', 17' are pivotally connected to the jack links 19', 20', 21', 22' by pivot pins 31', 32', 33', 34'. The remaining ends of the several jack links of each jack 13, 14 are pivotally connected to spaced parallel trunnions 35, 36 which extend transversely between the two jacks 13, 14. Adjacent to each jack 13, 14 the trunnions 35, 36 have diametrally extending threaded holes 37, 38, 39, 40 (FIG. 3) for receiving the threaded ends 41, 42, 43, 44 of adjusting screws 45, 46. The ends 41, 44 preferably have left hand threads while the ends 42, 43 have right hand threads. At one of their ends the adjusting screws 45, 46 have knobs 47, 48 rigidly mounted thereon.

By manipulating the knobs 47, 48 each of the adjusting screws 45, 46 can be independently operated to raise or lower either of the jacks 13, 14. Consequently, each end of the upper frame 4 can be raised or lowered to a limited extent, thereby to change the elevation of the upper frame 4 or tilt it to a selected angle to the horizontal. The tolerances of the several parts of the jacks 13, 14 and trunnions 35, 36 are such as to permit a limited amount of independent raising or lowering of each jack 13, 14, the amount of movement being determined by the position at which the jack beings to bind. Furthermore, the threaded ends 41, 42, 43, 44 are self-locking so that the jacks 13, 14 will remain in the position in which they are set by the adjusting screws 45, 46.

Mounted for sliding movement along the upper frame 4 is a resilient seat suspension, generally designated at 49. This seat suspension 49 comprises a base frame 50 which includes spaced parallel side plates 51, 52 which are cross connected at their forward ends by a formed channel plate 53. The channel plate 53 is rigidly secured to the side plates 51, 52 by bolts 54. To the under sides of the side plates 51, 52 a pair of spaced parallel upper channels 55, 56 is secured by the bolts 54 and also by the bolts 57. Referring to FIGS. 4 and 6, it will be seen that the channels 55, 56 each have side flanges 58, 59 which embrace the side flanges on the channel rails 8, 9. Two pairs of ball bearings 60, 61, 60′, 61′ are interposed between the rails 8, 9 and channels 55, 56 to permit a relatively free sliding movement of the base frame 50 along the pedestal channel rails 8, 9. Mounted in the channel rails 8, 9 and extending lengthwise thereof, are flat leaf springs 62, 63 which insure rolling contact of the ball bearings 60, 60′, 61, 61′ with the channel rails 8, 9 and channels 55, 56 as the seat suspension 49 slides along the channel rails 8, 9. Struck upwardly from the channel rails 8, 9 adjacent to their forward ends are stops 64, 65 against which the ball bearings 60, 60′ abut when the seat suspension 49 has been shifted to its forwardmost position along the channel rails 8, 9. The bolts 57 constitute rear stops against which the ball bearings 60, 60′, 61, 61′ abut when the seat suspension is shifted to its extreme rearwardmost position.

Secured to the top sides of the channels 55, 56 by rivets 66, are latch brackets 67, 68, and rockably mounted on the latch brackets 67, 68 by rivets 69, 70 are latch plates 71, 72. The latch plates 71, 72 are formed at one end with depending latch fingers 73, 74 which are adapted to project into slots 75, 76 formed in the side flanges 58, 59. The side flanges of the channel rails 8, 9 are cut along a portion of their lengths in the provision of a plurality of notches 77, 78 into which the latch fingers 73, 74 project to lock the seat suspension 49 in its selected position of adjustment relative to the channel rails 8, 9. A similar series of notches 77′, 78′ may be formed in the laterally outer flanges of the channel rails 8, 9 so that the channel rails 8, 9 may be fabricated identically and assembled with either channel rail on either side of the base frame 50.

The latch fingers 73, 74 are biased into engagement with the notches 77, 78 by springs 79, 80, the ends of which project through holes 81, 82 in the channels 55, 56 to anchor one end of each of the springs 79, 80 in place. The other ends of the springs are anchored to the latch plates 71, 72. The two latch plates 71, 72 are connected by a rod 83 of heavy gauge wire stock, the ends of which are formed with hooks 84, 85 and project through holes 86, 87 in the latch plates 71, 72. Welded or otherwise rigidly secured to the latch plate 71 is a handle 86 which projects forwardly of the front end of the base frame 50. By moving the handle 86 in a clockwise direction, as viewed from FIG. 4, the latch fingers 73, 74 will become disengaged from within the notches 77, 78, thereby permitting the seat suspension 49 to be shifted in either direction along the channel rails 8, 9. When the desired position of adjustment of the seat suspension is reached the handle 86 is released, whereupon the springs 79, 80 cause the latch fingers 73, 74 to lock into the adjacent notches 77, 78.

A seat-supporting platform 87 is located in upwardly spaced parallel relation to the base frame 50 and comprises side plates 88, 89 cross connected at their rearward ends by a formed channel plate 90. Bolts 91 secure the opposite ends of the channel plates 90 to the side plates 88, 89. The seat-supporting platform 87 is connected to the base frame 50 for oscillating movement with respect thereto by the torsion spring assemblies 92, 93, 94, 95. The torsion spring assemblies 92, 93, 94, 95 include four sleeves 96, 97, 98, 99 which are welded to the upwardly presented surface of the side plates 51, 52. Furthermore, a similar group of sleeves 100, 101, 102, 103 is welded to the downwardly presented surface of the side plates 88, 89. Each of the several sleeves has thereon a rubber torsion spring 104, and mounted within the sleeves are four torsion arms 105, 106, 107, 108. These torsion arms 105, 106, 107, 108 energize the torsion springs within the sleeves and, furthermore, the torsion arms form a parallelogram linkage connection between the seat-supporting platform 87 and the base frame 50. In connection with the present invention it should be noted that the torsion springs are preferably of the type shown in U.S. Patent No. 2,712,742 and, therefore, further description of the torsion springs and their theory of operation are not shown or described herein. The torsion arms 105, 106, 107, 108 are square in cross section and the upper ends of the torsion arms 105, 108 are joined together by a tube 109, the opposite ends of which form companion sockets 110, 111 for receiving the ends of torsion arms 105, 108. The latter are held within the sockets 110, 111 by screws 112. Similarly, the lower ends of the torsion arms 106, 107 are joined together by a tube 113 which is similar to the tube 109, previously described, and has socket-forming ends 114, 115 into which the ends of the torsion arms 106, 107 are fitted. Locking screws 116 hold the tube 113 and torsion arms 106, 107 in assembled relationship.

Figure 1:
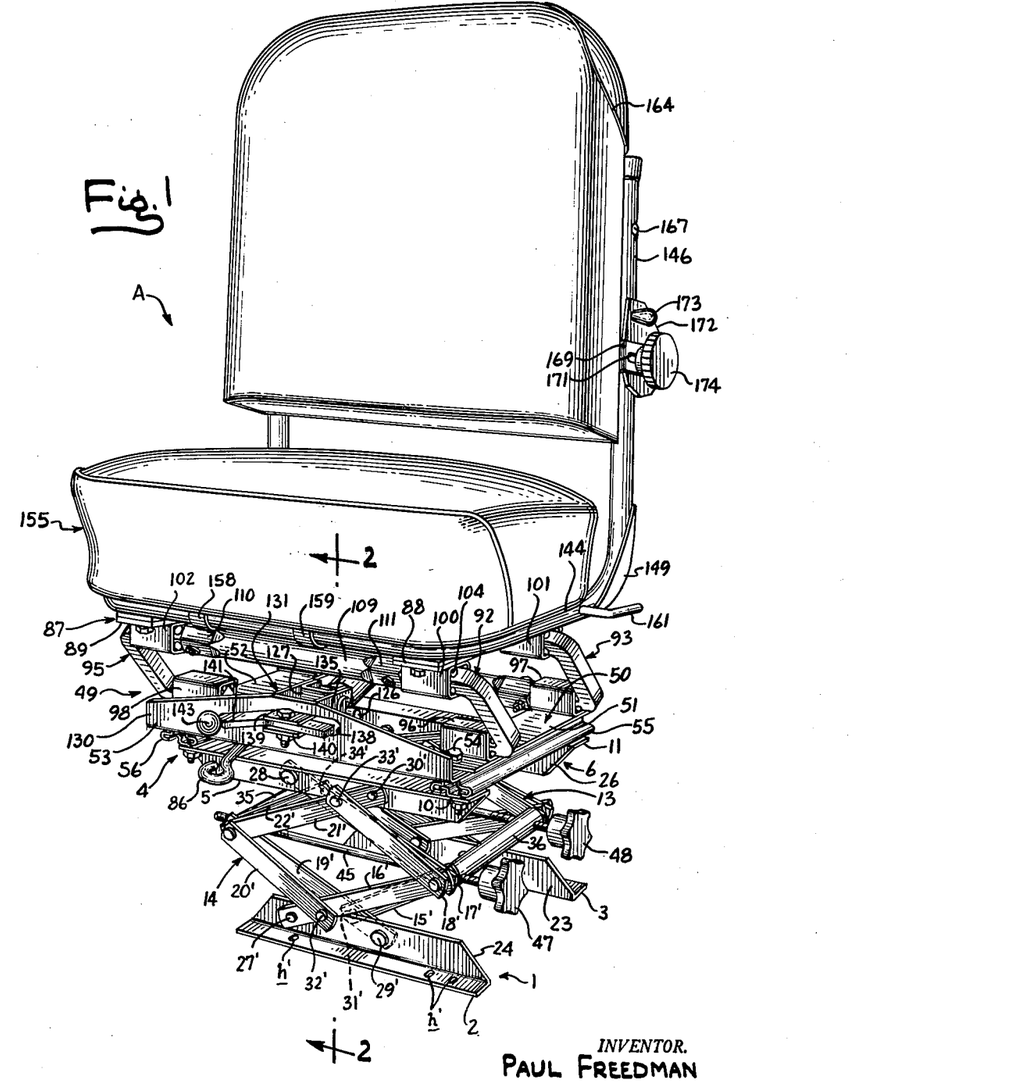
FIG. 1 is a perspective view of a vehicle seat constructed in accordance with and embodying the present invention.
Figure 2:
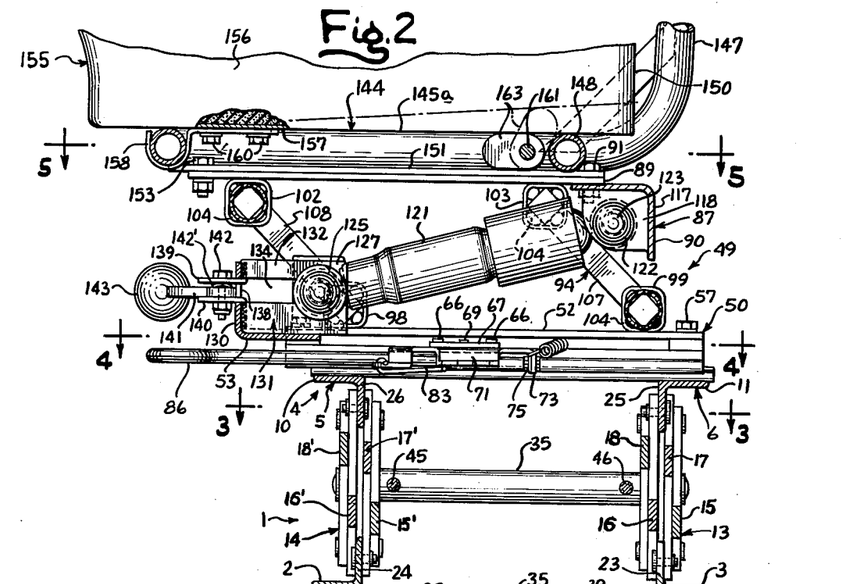
FIG. 2 is a fragmentary sectional view taken approximately along line 2—2 of FIG. 1.
Figures 5, 7, 8:
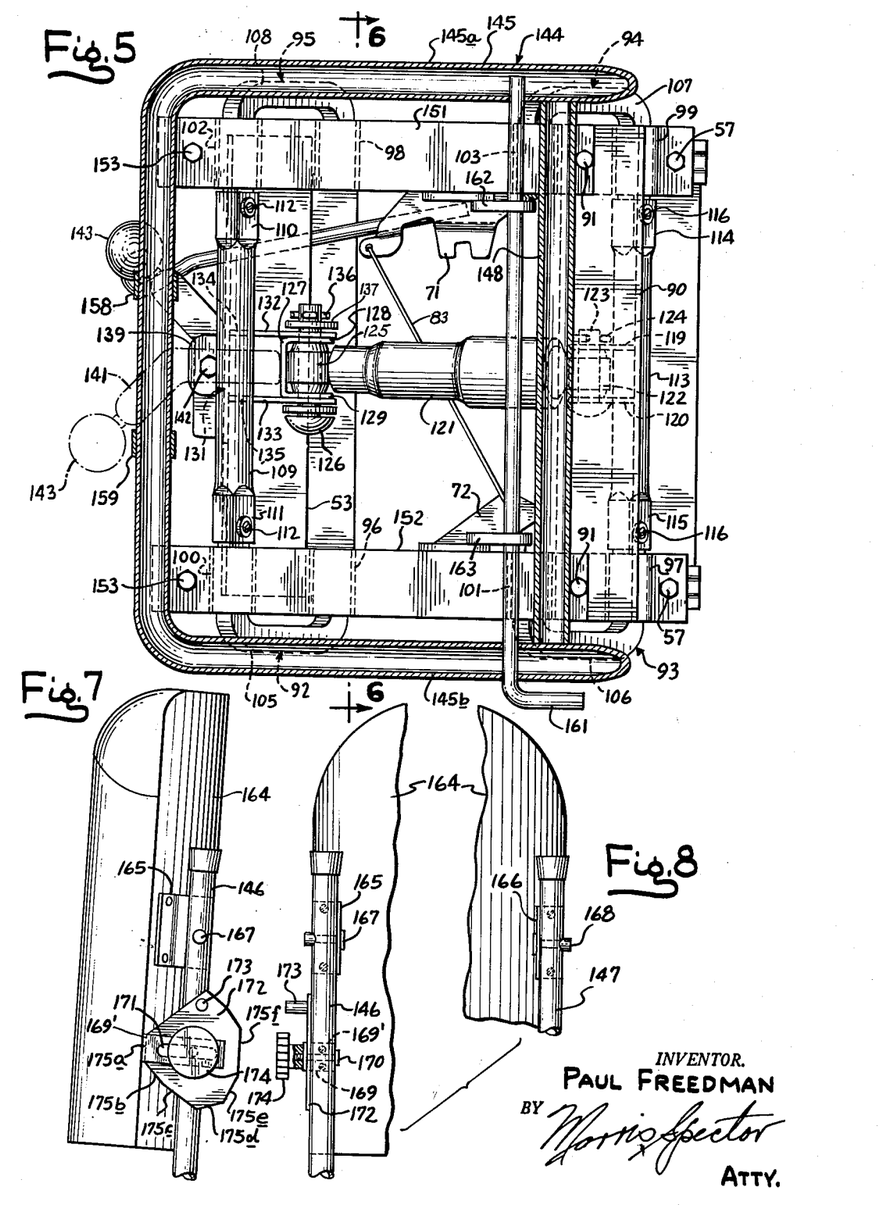
FIG. 7 is a fragmentary elevational view showing the back rest mounting and adjustment therefor.
FIG. 8 is a fragmentary rear elevational view, partly broken away and in section, of the structure shown in FIG. 7.

Welded to the downwardly presented face of the channel plate 90 and to the end flange 117 thereof is a U-shaped bracket 118 having spaced parallel depending ears 119, 120. A shock absorber 121 having an eye 122 at one end thereof is pivotally connected to the bracket 118 by a pivot pin 123. This shock absorber 121 may be any known piston-type shock absorber as, for example, of the types shown in United States Patents Nos. 2,394,356 and 2,396,227. The pivot pin 123 projects through the ears 119, 120 and is retained against axial movement by a cotter pin 124. The other end of the shock absorber 121 also has an eye 125 which receives a pivot pin 126. The pivot pin 126 projects through a U-shaped bracket 127, the legs 128, 129 of which embrace the eye 125. Welded to the inside face of the formed channel plate 53 and also to its vertical end flange 130 is another U-shaped bracket 131 having sides 132, 133. The sides 132, 133 are formed with longitudinal slots 134, 135 which slidably receive the pivot pin 126. The spacing of the sides 132, 133 is slightly greater than the width of the bracket 127 so as to permit sliding of the bracket 127 between the sides 132, 133. As seen in FIG. 5 the pivot pin 126 projects through the slots 134, 135 and is retained against axial movement by a cotter pin 136. A washer 137 may, if desired, be interposed between the cotter pin 136 and the side 132. As best seen in FIGS. 1 and 2 the vertical flange 130 is formed with a longitudinal slot 138 immediately in front of the bracket 131 and a pair of vertically spaced angle plates 139, 140 are welded to the end flange 130 and project through the slot 138. A lever 141 is pivotally mounted on the angle plates 139, 140 by a bolt 142, and the lever 141 has a knob 143 on the outer end thereof. A spring washer 142′ is mounted on the bolt 142 between the angle plates 139, 140. The lever 141 may be swung to and from the full and dotted line positions shown in FIG. 5. When in the dotted line position shown in FIG. 5 the end of the lever 141 abuts the bracket 127 to hold the bracket 127 and pivot pin 126 against the rear ends of the slots 134, 135. When the lever is shifted to the full line position shown in FIG. 5 the bracket 127, pivot pin 126 and that end of the shock absorber to which it is secured, can slide along the channel plate 53 between the bracket walls 132, 133 as the seat platform 87 oscillates toward and away from the pedestal 1, all for the purposes presently more fully appearing.

Mounted on the side plates 88, 89 of the seat platform 87 is a seat frame 144 which consists of a U-shaped piece of tubing 145 having sides 145a, 145b (FIG. 5). The rear ends of the sides 145a, 145b curve upwardly to form spaced back rest columns 146, 147. A piece of cross tubing 148 also forms part of the seat frame 144 and is welded to the sides 145a, 145b and extends therebetween adjacent to the back rest columns 146, 147. Gusset plates 149, 150 may be welded to the seat frame 144 to reinforce it at the lower ends of the back rest columns 146, 147.

Welded to the underside of the seat frame tubing 145, 148 are spaced parallel mounting plates 151, 152 which rest on the side plates 88, 89. The bolts 91 project through the rear ends of the mounting plates 151, 152 to secure the rear end of the seat frame 144 firmly to the seat platform 87. Also, bolts 153 project through the front ends of the mounting plates 151, 152 and the side plates 88, 89 and thereby secure the front end of the seat frame 144 in place.

A seat 155 having a seat cushion 156 and a seat board 157 is mounted on the seat frame 144. A pair of clips 158, 159 is secured to the under side of the seat board 157 by bolts 160 (FIG. 2). As best seen in FIGS. 1 and 2, the forward ends of the clips 158, 159 curve around and embrace the tubing of the seat frame 144 to mount the seat 155 hingedly onto the seat frame 144. A cam rod 161 is rotatably mounted in the sides 145a, 145b near the cross tubing 148 and extends transversely of the seat frame, and the cam rod 161 has spaced cams 162, 163 rigidly mounted thereon. When the cam rod 161 is in the position wherein the cams 162, 163 are as shown in FIGS. 2 and 6 (full lines FIG. 2), the rear end of the seat 155 will rest against the rear end of the seat frame 144. However, when the cam rod 161 is rotated to move the cams 162, 163 to the dotted line position shown in FIG. 2, the rear end of the seat 155 is elevated slightly to tilt the seat cushion 156 slightly forwardly.

Referring to FIGS. 1, 7 and 8, a back rest 164 has a pair of brackets 165, 166 mounted thereon and through which project bolts 167, 168, the latter also projecting through the back rest columns 146, 147 for pivotally mounting the back rest 164 to the columns 146, 147. To adjust the angular position of the back rest 164 an L-shaped bracket 169 having a front flange 169' is secured to the back rest and projects rearwardly thereof alongside of the back rest column 146. A stud 170 is rigidly mounted in the back rest column 146 and projects through a longitudinal slot 171 formed in the bracket 169. The stud 170 also projects through a seat adjustment cam 172, the latter having a handle 173 thereon. A clamping knob 174 is internally threaded for receiving the stud 170 to lock the cam 172 rigidly in position. The cam 172 has a plurality of flat cam edges 175a, 175b, 175c, etc. which are at varying distances from the center of rotation of the cam, which center is also coincident with the central axis of the stud 170. By loosening the knob 174, the cam 172 may be rotated to position one of its edges against the front flange 169', it being understood that the back rest 164 will be tilted to such an angle as to permit the particular cam edge to fit flush against the front flange 169'. Then the knob 174 may be tightened to hold the back rest in that position.

The seat assembly A is ordinarily the driver's seat in the vehicle. While sitting on the seat 155 the driver can readily grasp the knobs 47, 48 to turn the adjusting screws 45, 46 and thereby set the height of the seat as well as tilt it forwardly and backwardly. If additional forward tilting is desired, the cam rod 161 can be rotated to move the cams 162, 163 to the dotted line position shown in FIG. 2. Also, the position of the seat 155 can be adjusted forwardly and rearwardly of the pedestal wheel in the vehicle by the manipulation of the handle 86 to release the latch plates 71, 72 from the notches 77, 78. Ordinarily, the shock absorber 121 remains in the "disengaged" position, that is, the lever 141 is in the position shown in full lines in FIG. 5. As the vehicle travels along the road, the road shock transmitted to the seat will be taken up by the torsion spring assemblies on the seat suspension 49. Thus, the seat platform 87 together with the seat 156 will oscillate generally upwardly and downwardly but along an arcuate path. As the seat and seat suspension oscillate the bracket 128, pin 126 and the end of the shock absorber at 122 will slide back and forth along the bracket 131 and the shock absorber 121 will be disengaged or rendered ineffective. However, if the vehicle reaches a stretch of road wherein the oscillations of the seat 156 are excessive because the natural frequency of the seat and seat suspension has been reached or nearly approached, the driver, while remaining in the seat and while the vehicle is still in motion, can reach under the seat and grasp the knob 143 and quickly swing the lever 141 to the dotted line position shown in FIG. 5. This will urge the bracket 127 towards the rear end of the bracket 131 and hold the pin 126 firmly in position at the ends of the slots 134, 135. Consequently, as the seat and seat platform oscillate the end of the shock absorber at 122 will be unable to slide back and forth and so the shock absorber 121 will be cut in and will, in effect, change the natural frequency of the seat and suspension. Therefore, the shock absorber 121 will be effective to reduce the amplitude of the oscillations of the seat over this particular stretch of road. At any time thereafter, the driver can quickly swing the lever 141 to the full line position shown in FIG. 5 to again disengage the shock absorber 121.

Figure 9:
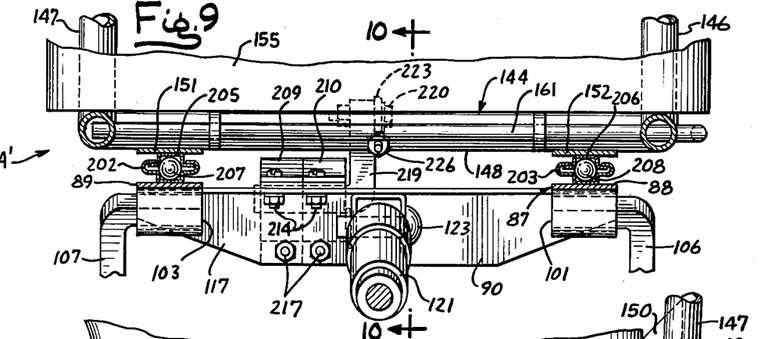
FIG. 9 is a fragmentary sectional view similar to FIG. 6 but showing a modified form of the present invention.
Figure 10:
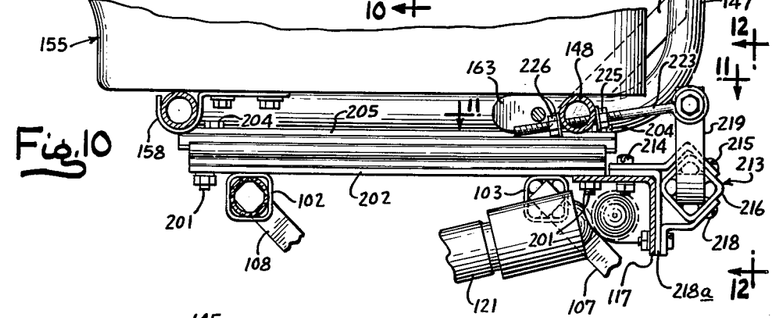
FIG. 10 is a fragmentary sectional view taken approximately along line 10—10 of FIG. 9.
Figure 11:
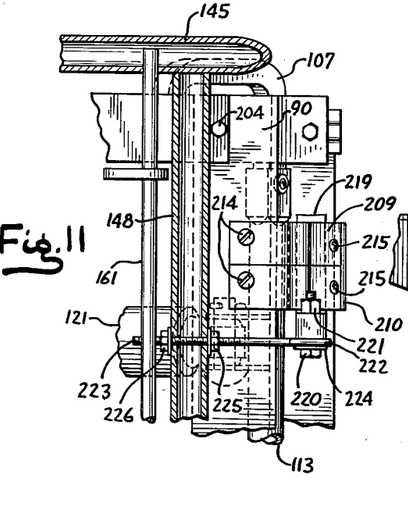
FIG. 11 is a fragmentary sectional view taken along line 11—11 of FIG. 10.
Figure 12:
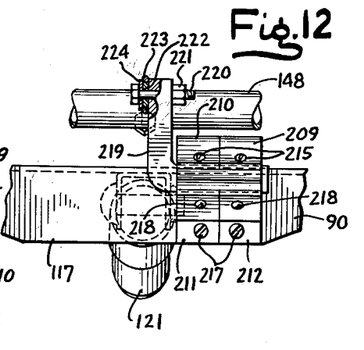
FIG. 12 is a fragmentary rear elevational view, partly broken away and in section, of the assembly of FIG. 10 as seen from line 12—12 therein.

It is also possible to provide a modified form of vehicle seat assembly A', as shown in FIGS. 9–12, which is similar to the vehicle seat assembly A, previously described, except for the manner in which the seat frame 144 is mounted on the seat-supporting platform 87. In the seat assembly A' there is secured to the plates 88, 89 by bolts 201 a pair of channel rails 202, 203. The channel rails 202, 203 extend lengthwise of the plates 88, 89 and are parallel to the channel rails 8, 9, previously described. Secured to the seat frame mounting plates 151, 152 by means of bolts 204 are spaced parallel channels 205, 206, the lateral flanges of which are embraced by the lateral flanges of the channel rails 202, 203 as seen in FIG. 9. The channel rails 202, 203 have ball bearings 207, 208, and preferably there is a pair of ball bearings in each channel rail 202, 203 as in the case of the ball bearings 60, 60', 61, 61' in the channel rails 8, 9. By reason of the foregoing the seat frame 144 is slidable forwardly and rearwardly on the seat-supporting platform 87 along the channel rails 202, 203.

Mounted on the channel plate 90 by brackets 209, 210, 211, 212 is a torsion spring 213 which is located to the rear of the channel plate 90. The brackets 209, 210 are secured to the channel plate 90 by bolts 214, and screws 215 project through the brackets 209, 210 and are threaded into the sleeve 216 of the torsion spring 213. Similarly, bolts 217 secure the brackets 211, 212 to the end flange 117 of the channel plate 90, and screws 218 project through the brackets 211, 212 and are threaded into the sleeve 216. An L-shaped spacer plate 218a (FIG. 10) may be interposed between the brackets with an edge of the sleeve 216 abutting the plate 218a. Extending axially through the sleeve 216 and being rockable therein is a torsion arm 219 which has a right angle bend and projects upwardly towards the seat frame 144. A bolt 220 projects through the upper end of the torsion arm 219 and secured thereto by a nut 221. Mounted on the bolt 220 is a bearing collar 222 and the bearing collar 222 rotatably supports the eye portion of an eyebolt 223. A washer 224 prevents axial movement of the eyebolt 223 in the direction of the head of the bolt 220. The threaded end of the eyebolt 223 extends through the cross tubing 148 and nuts 225, 226 are threaded onto the eyebolt and are drawn up tightly on either side of the cross tubing 148. The torsion spring 213 is also of the type described in U.S. Patent No. 2,712,742, and is, therefore, not further described herein.

Since the eyebolt 223 connects the seat frame to the rockable torsion arm 219 which, in turn, energizes the torsion spring 213, movement of the seat frame with the seat thereon in either direction will be opposed or damped by the torsion spring 213. If, for example, the seat suspension A' is used within a truck-tractor the torsion spring assembly 213 will be effective in reducing the whip and back slap in the cab of the tractor. Thus, when the rear wheels of the tractor strike a bump in the road, the rear of the tractor will rise, tending to pitch the driver forwardly relative to the seat and create a "whip." When this occurs the seat frame 144 and seat 155 will slide forwardly energizing the torsion spring 213, whereby the latter damps out the forces tending to produce a whip. Similarly, when the bump has been passed and the weight of the front end of the trailer drops sharply upon the fifth wheel of the tractor, the forces created tend to throw the driver sharply against the back rest of the seat. However, the seat suspension and seat will move rearwardly and the torsion spring 213 will damp out the "back slap" force imposed on the seat. It will be seen therefore, that since whip and back slap created in the cab of the tractor is taken up by the damped forward and rearward movement of the seat frame, driver fatigue is reduced considerably.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. In combination, a pedestal, a seat, resilient suspension means mounting the seat on the pedestal for oscillating movement of the seat relative to the pedestal, said suspension including shock-absorbing means adapted to be rendered in effective and ineffective conditions for damping the oscillating movement of the seat, and means operable by a person sitting on the seat to change the shock-absorbing means from one condition to the other.

2. In combination, a pedestal, a seat, a torsion spring suspension mounting the seat on the pedestal for oscillating movement of the seat relative to the pedestal, said suspension including shock-absorbing means adapted to be rendered in effective and ineffective conditions for damping the oscillating movement of the seat, and means operable by a person sitting on the seat to change the shock-absorbing means from one condition to the other.

3. In combination, a resilient seat suspension having a seat-support adapted for oscillating movement, a seat carried by said seat support and movable therewith, said suspension including shock-absorbing means adapted to be rendered in effective and ineffective conditions for damping the oscillating movement of the seat and seat-support, and means operable by a person sitting on said seat to change the shock-absorbing means from one condition to the other.

4. In combination, a seat, a seat suspension having a base frame, a seat-support in spaced relation to the base frame and upon which the seat is mounted, means including an arm joining the base frame and seat support for permitting oscillating movement of the seat and seat-support relative to said base frame, torsion spring means energized by the arm upon movement of the seat and seat-support, shock-absorbing means adapted to be rendered in effective and ineffective conditions for damping the oscillating movement of the seat and seat-support, and means operable by a person sitting on the seat to change the shock-absorbing means from one condition to the other.

5. A seat suspension having a base frame, a seat-support in spaced relation to the base frame, means including an arm joining the base frame and seat-support for permitting oscillating movement of the seat-support relative to said base frame, torsion spring means energized by the arm upon movement of the seat-support, shock-absorbing means operatively connecting the seat-support and base frame for damping the oscillating movement of the seat-support, and means operable selectively to render ineffective and effective the damping action of the shock-absorbing means.

6. A seat suspension having a base frame, a seat-support in spaced relation to the base frame, a plurality of parallel arms pivotally connected to the base frame and to the seat-support for permitting oscillating movement of the seat-support relative to said base frame, torsion springs being at least at one of the pivoted connections of each arm and said torsion springs being energized upon movement of the seat support, shock-absorbing means operatively connecting the seat-support and base frame for damping the oscillating movement of the seat-support, and means operable selectively to render ineffective and effective the damping action of the shock-absorbing means.

7. A seat suspension having a base frame, a seat-support in spaced parallel relation to the base frame, means including two parallel arms each pivotally connected to the base frame and to the seat-support for permitting oscillating movement of the seat-support relative to said base frame, the four pivot axes being parallel, torsion springs being at least at one of the pivotal connections of each arm and said torsion springs being energized upon movement of the seat-support, shock-absorbing means operatively connecting the seat-support and base frame for damping the oscillating movement of the seat-support, and means operable selectively to render ineffective and effective the damping action of the shock-absorbing means.

8. A seat suspension having a base frame, a seat-support in spaced parallel relation to the base frame, means including two parallel arms each pivotally connected to the base frame and to the seat-support for permitting oscillating movement of the seat-support relative to said base frame, the four pivot axes being parallel, sleeves mounted on the base frame and seat-support and surrounding the pivot axes, said sleeves receiving the arms, torsion springs in said sleeves and being energized upon movement of the seat support, shock-absorbing means operatively connecting the seat-support and base frame for damping the oscillating movement of the seat-support, and means operable selectively to render ineffective and effective the damping action of the shock-absorbing means.

9. A seat suspension having a base frame, a seat-support in spaced relation to the base frame, means including an arm joining the base frame and seat-support for permitting oscillating movement of the seat-support relative to said base frame, torsion spring means energized by the arm upon movement of the seat-support, shock-absorbing means operatively connecting the seat-support and base frame, said shock-absorbing means being in pivotal and sliding connection with one of said base frame and seat-support, and selectively operable lever means movable to lock and unlock said sliding connection, said shock-absorbing means being operable to damp the oscillating movement of the seat-support when the sliding connection is locked and being inoperable to damp said oscillating movement when the sliding connection is unlocked.

10. A seat suspension having a base frame, a seat-support in spaced relation to the base frame, means including two parallel arms each pivotally connected to the base frame and to the seat-support for permitting oscillating movement of the seat-support toward and away from said base frame, torsion springs being at least at one of the pivotal connections of each arm and said torsion springs being energized upon movement of said seat support toward said base frame, shock-absorbing means operatively connected to the seat-support and base frame, said shock absorbing means being in pivotal and sliding connection with one of said base frame and seat-support, and selectively operable lever means movable to lock and unlock said sliding connection, said shock absorbing means being operable to damp the oscillating movement of the seat-support when the sliding connection is locked and being inoperable to damp said oscillating movement when the sliding connection is unlocked.

11. In combination, a seat-suspension having a base frame, a seat-support in spaced relation to said base frame and a seat mounted on said seat support, means including an arm joining the base frame and seat support for permitting oscillating movement of the seat and seat-support relative to said base frame, torsion spring means energized by the arm upon movement of the seat and seat-support, shock-absorbing means for damping the oscillating movement of the seat and seat-support, means operable selectively by a person sitting in the seat to render ineffective and effective the damping action of the shock-absorbing means, a pedestal upon which the seat-suspension is slidably mounted, and means co-operating with the pedestal and seat-suspension for selectively locking the seat-suspension to the pedestal in any one of a plurality of positions on said pedestal, said pedestal including means for adjusting the height thereof.

12. In combination, a seat-suspension having a base frame, a seat-support in spaced relation to said base frame and a seat mounted on said seat support, means including an arm joining the base frame and seat support for permitting oscillating movement of the seat and seat-support relative to said base frame, torsion spring means energized by the arm upon movement of the seat and seat-support, shock-absorbing means for damping the oscillating movement of the seat and seat-support, means operable selectively by a person sitting in the seat to render ineffective and effective the damping action of the shock-absorbing means, a pedestal upon which the seat-suspension is slidably mounted, and means cooperating with the pedestal and seat-suspension for selectively locking the seat-suspension to the pedestal in any one of a plurality of positions on said pedestal, said pedestal having a pair of jacks, one at each end of the pedestal, and being individually operable to adjust the height of each of those ends of the pedestal and thereby adjust the height and angle of tilt of the seat.

13. In combination, a seat suspension having a base frame, a seat support in spaced parallel relation to the base frame and a seat mounted on said seat support, means including two parallel arms each pivotally connected to the base frame and to the seat-support for permitting oscillating movement of the seat and seat-support toward and away from said base frame, the four pivot axes being parallel, sleeves mounted on the base frame and seat support and surrounding the pivot axes, said sleeves receiving the arms, torsion springs in said sleeves and being energized upon movement of the seat and seat-support toward said base frame, shock absorbing means being in pivotal and sliding connection with one of said seat-support and base frame, and lever means selectively operable by a person sitting in the seat to lock and unlock said sliding connection, said shock absorbing means being operable to damp the oscillating movement of the seat and seat-support when the sliding connection is locked and being inoperable to damp said oscillating movement when the sliding connection is unlocked, a pedestal, and means for slidably mounting the seat suspension on the pedestal, means for locking the seat suspension to the pedestal in any one of a plurality of positions to adjust the position of the seat relative to the pedestal, said pedestal having jack means operable to adjust independently the height of two opposite ends of the pedestal and thereby adjust the height and angle of tilt of the seat.

14. In combination, a seat suspension, a seat frame mounted on said seat suspension for sliding movement in fore and aft directions along said suspension, spring means operatively connecting the seat frame and suspension for resisting the sliding movement of the seat frame in both directions, the seat frame being otherwise freely slidable on said seat suspension a support, means for supporting the seat suspension and seat frame on the support for movement in union therealong in said two opposite directions, and means for selectively locking the seat suspension to the support in any one of a plurality of selected positions relative to the support.

15. In combination, a seat suspension, a seat frame mounted on said seat suspension for sliding movement in fore and aft directions along said suspension, torsion spring means operatively interposed between the seat frame and seat suspension for resisting the sliding movement of the seat frame in both directions a support, means for supporting the seat suspension and seat frame on the support for movement in union therealong in said two opposite directions, and means for selectively locking the seat suspension to the support in any one of a plurality of selected positions relative to the support.

16. In combination, a resilient seat suspension having a seat-support adapted for oscillating movement, a seat carried by said seat-support and movable therewith, said seat also being mounted on the seat-support for slidable movement in two opposite directions therealong, means operatively connecting the seat and suspension for resisting the sliding movement of the seat in both directions, said seat suspension including shock-absorbing means for damping the oscillating movement of the seat and seat support, and means operable to render ineffective and effective selectively the damping action of the shock-absorbing means.

17. In combination with an automobile, a seat mounted therein, a first means for damping the vibration of the seat caused by movement of the automobile, a second means for damping the vibration of the seat caused by movement of the automobile, the natural frequency of resonance of the seat when subjected to the action of both damping means being different from its resonant freqency when subjected to the action of only one of said damping means, and means including an operating lever operably selectively by a person sitting on the seat to render effective and to render ineffective one of said damping means while the automobile is being driven by the person on the seat, whereby the resonant frequency of the seat can be changed, during driving operations, to reduce vibration that is brought about by temporary objectionable combinations of speed and road conditions.

18. In combination, a resilient seat suspension having a seat-support and means mounting the seat-support for oscillating movement in an arcuate path, a seat carried by said seat-support and movable therewith, said suspension also including shock-absorbing means adapted to be rendered in effective and ineffective conditions for damping the oscillating movement of the seat and seat-support, and means operable by a person sitting on said seat to change the shock absorbing means from one condition to the other.

19. A vehicle seat assembly comprising a seat and a base means joining the base and seat for permitting oscillating movement of the seat relative to the base, the means including two damping means providing different natural frequencies for the seat, and means operable by a person sitting on the seat for altering the effectiveness of one of the damping means independently of the other damping means to change the natural frequency of the seat.

20. A seat suspension having a seat-support and a base frame, and means joining the seat-support and base frame for permitting oscillating movement of the seat-support relative to said base frame; said means including first and second damping means, the natural frequency of the seat-support when subjected to the action of both damping means being different from its natural frequency when subjected to the action of only the first of the damping means, and means for rendering effective and ineffective the damping action of the second damping means independently of the damping action of said first damping means.

21. A seat suspension comprising a seat support having means for slidably receiving a seat for movement of the seat in two opposite directions therealong, and resilient means adapted for operative connection to the seat to resist said sliding movement thereof in both directions, said suspension also having a base frame, and means joining the seat support to the base frame; said means including first and second damping means, the natural frequency of the seat-support when subjected to the action of both damping means being different from its natural frequency when subjected to the action of only the first of the damping means, and means for rendering effective and ineffective the damping action of the second damping means independently of the damping action of said first damping means.

22. In combination, a seat and a base upon which the seat is mounted, and means joining the base and seat for permitting oscillating movement of the seat relative to the base; said means including first and second damping means, the natural frequency of the seat when subjected to the action of both damping means being different from its natural frequency when subjected to the action of only the first of said damping means, and means for rendering effective and ineffective the damping action of the second damping means independently of the damping action of said first damping means.

23. In combination, a seat and a base upon which the seat is mounted, and means joining the base and seat for permitting oscillating movement of the seat relative to the base; said means including first and second damping means, the natural frequency of the seat when subjected to the action of both damping means being different from its natural frequency when subjected to the action of only the one of said damping means, and means operable by a person sitting on the seat to render ineffective the damping action of the other of the damping means.

24. In combination, a seat and a base upon which the seat is mounted, and means joining the base and seat for permitting oscillating movement of the seat relative to the base; said means including first and second damping means, the latter of which is adapted to be rendered effective and ineffective for damping action, the natural frequency of the seat when subjected to the action of both damping means being different from its natural frequency when subjected to the action of only the first of said damping means, and means operable by a person sitting on the seat to render from ineffective to effective condition the damping action of the second damping means.

25. In combination, a seat suspension having a seat-support and a base frame, means joining the seat-support and base frame for permitting oscillating movement of the seat support relative to the base frame, said means including first and second damping means, the natural frequency of the seat-support when subjected to the action of both damping means being different from its natural frequency when subjected to the action of only the first of said damping means, means for rendering effective and ineffective the damping action of the second damping means independently of the damping action of the first damping means, a pedestal upon which the seat-suspension is mounted, and means for adjusting the height of the pedestal.

References Cited in the file of this patent

UNITED STATES PATENTS

| | | |
|---|---|---|
| 1,807,960 | Brownell | June 2, 1931 |
| 2,534,047 | McIntyre | Dec. 12, 1950 |
| 2,629,427 | McIntyre | Feb. 24, 1953 |
| 2,690,786 | Sedlock | Oct. 5, 1954 |
| 2,707,019 | Sober | Apr. 26, 1955 |
| 2,840,140 | Harrington | June 24, 1958 |
| 2,856,984 | Simons | Oct. 21, 1958 |
| 2,875,810 | Simons | Mar. 3, 1959 |
| 2,932,342 | Simons | Apr. 12, 1960 |
| 2,950,785 | Patriquin | Aug. 30, 1960 |

FOREIGN PATENTS

| | | |
|---|---|---|
| 1,081,131 | France | June 4, 1954 |

Notice of Adverse Decision in Interference

In Interference No. 93,947 involving Patent No. 3,075,736, P. Freedman, VEHICLE SEAT, final judgment adverse to the patentee was rendered Apr. 29, 1966, as to claims 2, 4, 19, 20, 22 and 23.

[*Official Gazette October 25, 1966.*]